United States Patent
Cooper et al.

(10) Patent No.: US 7,213,033 B2
(45) Date of Patent: May 1, 2007

(54) AUTOMATICALLY POPULATING AN APPLICATION'S WORKING DIRECTORY WITH FILES HAVING A SPECIFIED TYPE FROM OTHER DIRECTORY LOCATIONS

(75) Inventors: Michael Richard Cooper, Austin, TX (US); James Lee Gray, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 843 days.

(21) Appl. No.: 10/042,007

(22) Filed: Jan. 8, 2002

(65) Prior Publication Data

US 2004/0249820 A1 Dec. 9, 2004

(51) Int. Cl.
*G06F 17/00* (2006.01)

(52) U.S. Cl. .................. 707/104.1; 707/102
(58) Field of Classification Search ............. 707/1–4, 707/100–102, 200, 205
See application file for complete search history.

(56) References Cited

U.S. PATENT DOCUMENTS

| | | | |
|---|---|---|---|
| 5,058,000 A | 10/1991 | Cox et al. | |
| 5,566,331 A | 10/1996 | Irwin, Jr. et al. | |
| 5,701,451 A | 12/1997 | Rogers et al. | |
| 5,710,918 A | 1/1998 | Lagarde et al. | |
| 5,721,908 A | 2/1998 | Lagarde et al. | |
| 5,752,246 A | 5/1998 | Rogers et al. | |
| 5,761,663 A | 6/1998 | Lagarde et al. | |
| 5,794,230 A | 8/1998 | Horadan et al. | |
| 5,864,853 A * | 1/1999 | Kimura et al. ............. 707/10 |
| 5,873,103 A | 2/1999 | Trede et al. | |
| 5,951,640 A | 9/1999 | Laura | |
| 6,026,405 A | 2/2000 | Arda et al. | |
| 6,047,318 A | 4/2000 | Becker et al. | |
| 6,094,655 A | 7/2000 | Rogers et al. | |
| 6,119,133 A | 9/2000 | Nusbickel et al. | |
| 6,842,770 B1 * | 1/2005 | Serlet et al. ............. 709/203 |

* cited by examiner

*Primary Examiner*—Alford W. Kindred
(74) *Attorney, Agent, or Firm*—Marilyn S. Dawkins (57) ABSTRACT

A system, method, and program of the invention enables a software programming tool to automatically populate a specified directory, such as a working directory of a specified application, with files matching a certain file type, e.g., *.gif, *.jpeg, or matching a general file description, e.g., pictures, images, spreadsheets, text. The files may reside within any directory accessible to the computer system running the specified application. When running the specified application, a user has access to all of the files matching the specified type or description from the one directory. The functionality of the tool is invoked each time the application is launched, without further user interaction, so that any newly created files matching the file type or general description are automatically copied or moved to the specified one directory.

16 Claims, 5 Drawing Sheets

AUTOMATICALLY POPULATING AN APPLICATION'S WORKING DIRECTORY WITH FILES HAVING A SPECIFIED TYPE FROM OTHER DIRECTORY LOCATIONS

BACKGROUND OF THE INVENTION

1. Field of the Invention

This invention relates to automatically populating an application's directory with files having a specified type from other directory locations; and more specifically, to a system, method, and program for scanning selected directories, when a given application is launched, for desired types of files and placing the files in a specified location for use by the given application in response to a user's previously configured request for such types of files.

2. Description of the Related Art

Most applications have a working directory for only the files and resources that the application owns or that have been created by the application. However, these same applications also are capable of using files/resources created by other applications. These other files/resources can exist in the default working directories of other applications, or they can be downloaded from across a communication link and placed in a user's download directory. As such, these other files/resources can be located anywhere on a user's system, including on removable media. For example, a print shop application program may have clip art on a CD.

A problem arises when these files/resources get lost; or when considerable time is taken up trying to find all of the desired files from among a plurality of applications that may have such files in their own working directories.

Some applications, at start up, may ask the user the name of the directory the user wants as the application's working or base directory for putting the working tools, dictionaries, help, etc., into. However, these files are already known to the application. The application does not go out and search for other files that may be located in other directories of other applications. Other applications may ask the user for the path name of desired files, but the user must already know the location, i.e., path name, of the files.

Virtual file systems exist today which are an abstraction of a physical file system. A virtual file system provides a consistent interface to multiple file systems, including local and remote file systems. The interface allows a user to view the directory tree on the running system as a single entity even when the tree is made up of a number of diverse file system types. For example, an application named image_app may have a working directory as "image_app/" having other directories virtually mapped to it under a virtual file system implementation.

However, such a mapping is not flexible or changeable from application to application. That is, a user would still have to take the time to locate files within the virtual file system that may be desired by the user for a given application.

It would be desirable to be able to retrieve all of a user's desired files from one directory or location while executing a given application, even when some of the files reside outside of the one directory, without requiring the user to specify the path name of each file at the time the file is needed for the application.

SUMMARY OF THE INVENTION

It is therefore an object of the present invention to automatically locate types of files previously specified by a user and to copy, or temporarily move, these files to a working directory of a given application whenever the given one of a plurality of applications is executed.

A system, method and program of the invention scans all selected directories and drives in a user's system for desired files, and places them in a specified location at the user's request. The desired files are placed in the specified location by creating a link to the desired files, or shadowing the desired files, or by moving or copying the desired files. The specified location may be a working directory for a given application. As such, whenever a user starts up an application, all of the user's desired files are readily accessible to the application from its working directory without the user having to, at a later time, determine, and specify, a path name for a file desired by the user while running the application.

More specifically, a software tool automatically searches for and locates all file types desired by a user, and copies or temporarily moves the files, into the working directory of a given application. The automatic application directory builder (AADB) tool has a user interface that enables a user to specify specific path names for directories or files, file types (masks), or more general file type descriptions. The user interface also enables a user to specify the name of the application and the name of the target location, e.g., the working directory of the application. The tool is invoked each time the application is launched so that any newly created files matching the file type or general description are automatically copied or moved to the specified target directory.

BRIEF DESCRIPTION OF THE DRAWINGS

For a more complete understanding of the present invention and the advantages thereof, reference should be made to the following Detailed Description taken in connection with the accompanying drawings in which.

DETAILED DESCRIPTION OF THE PREFERRED EMBODIMENTS

In the following description, reference is made to the accompanying drawings which form a part hereof, and which illustrate several embodiments of the present invention. It is understood that other embodiments may be utilized and structural and operational changes may be made without departing from the scope of the present invention.

The present invention may be executed in a variety of systems, including a variety of computing systems and electronic devices under a number of different operating systems. In one embodiment of the present invention, the computing system is a portable computing system such as a notebook computer, a palmtop computer, a personal digital assistant, a telephone or other electronic computing system that may also incorporate communications features that provide for telephony, enhanced telephony, messaging and information services. However, the computing system may also be, for example, a desktop computer, a network computer, a midrange computer, a server system or a mainframe computer. Therefore, in general, the present invention is preferably executed in a computer system that performs computing tasks such as manipulating data in storage that is accessible to the computer system. In addition, the computer system preferably includes at least one output device and at least one input device.

Figure 1:
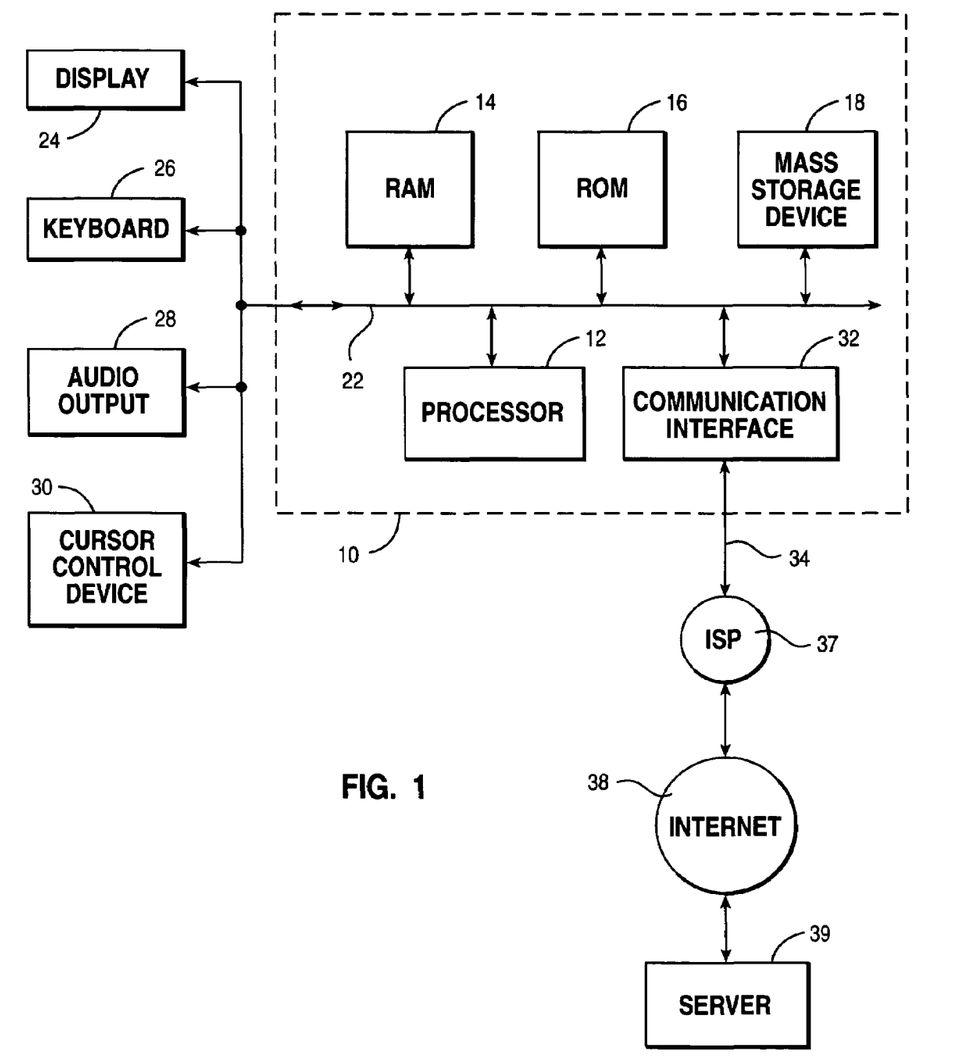
FIG. 1 depicts one embodiment of a computer system with which the method, system, and program of the present invention may be utilized.

Referring now to the drawings, and in particular to FIG. 1, there is depicted one embodiment of a computer system with which the method, system, and program of the present invention may be advantageously utilized. Computer system 10 comprises a bus 22 or other communication device for communicating information within computer system 10, and at least one processing device such as processor 12, coupled to bus 22 for processing information. Bus 22 preferably includes low-latency and high-latency paths that are connected by bridges and controlled within computer system 10 by multiple bus controllers.

Processor 12 may be a general-purpose processor such as IBM's PowerPC™ processor that, during normal operation, processes data under the control of operating system and application software stored in a dynamic storage device such as a random access memory (RAM) 14 and a static storage device such as Read Only Memory (ROM) 16. The operating system preferably provides a graphical user interface (GUI) to the user. In a preferred embodiment, application software contains machine executable instructions that when executed on processor 12 carry out the operations depicted in the flowcharts described herein. Alternatively, the steps of the present invention might be performed by specific hardware components that contain hardwire logic for performing the steps, or by any combination of programmed computer components and custom hardware components.

Further, multiple peripheral components may be added to computer system 10. For example, a display 24 is also attached to bus 22 for providing visual, tactile or other graphical representation formats. Audio output through a speaker or other audio projection device may be controlled by audio output device 28 attached to bus 22. A keyboard 26 and cursor control device 30, such as a mouse, track ball, or cursor direction keys, are coupled to bus 22 as interfaces for user inputs to computer system 10. It should be understood that keyboard 26 and cursor control device 30 are examples of multiple types of input devices that may be utilized in the present invention. In alternate embodiments of the present invention, additional input and output peripheral components may be added.

The present invention may be provided as a computer program product, included on a machine-readable medium having stored thereon the machine executable instructions used to program computer system 10 to perform a process according to the present invention. The term "machine-readable-medium" as used herein includes any medium that participates in providing instructions to processor 12 or other components of computer system 10 for execution. Such a medium may take many forms including, but not limited to, nonvolatile media, volatile media, and transmission media. Common forms of nonvolatile media include, for example, a floppy disk, a flexible disk, a hard disk, magnetic tape or any other magnetic medium, a compact disc ROM (CD-ROM), a digital video disc-ROM (DVD-ROM) or any other optical medium, punch cards or any other physical medium with patterns of holes, a programmable ROM (PROM), an erasable PROM (EPROM), electrically EPROM (EEPROM), a flash memory, any other memory chip or cartridge, or any other medium from which computer system 10 can read and which is suitable for storing instructions. In the present embodiment, an example of nonvolatile media is storage device 18. Volatile media includes dynamic memory such as RAM 14. Transmission media includes coaxial cables, copper wire or fiber optics, including the wires that comprise bus 22. Transmission media can also take the form of acoustic or light waves, such as those generated during radio wave or infrared data communications.

Moreover, the present invention may be downloaded as a computer program product, wherein the program instructions may be transferred from a remote computer such as server 39 to requesting computer system 10 by way of data signals embodied in a carrier wave or other propagation medium via a network link 34 (e.g., a modem or network connection) to a communications interface 32 coupled to bus 22. Communications interface 32 provides a two-way data communications coupling to network link 34 that may be connected, for example, to a local area network (LAN), wide are network (WAN), or as depicted herein, directly to an Internet Service Provider (ISP) 37. In particular, network link 34 may provide wired and/or wireless network communications to one or more networks.

ISP 37 in turn provides data communication services through the Internet 38 or other network. Internet 38 may refer to the worldwide collection of networks and gateways that use a particular protocol, such as Transmission Control Protocol (TCP) and Internet Protocol (IP), to communicate with one another. ISP 37 and Internet 38 both use electrical, electromagnetic, or optical signals that carry digital or analog data streams. The signals through the various networks and the signals on network link 34 and through communications interface 32, which carry the digital or analog data to and from computer system 10, are exemplary forms of carrier waves transporting the information.

Figure 2:
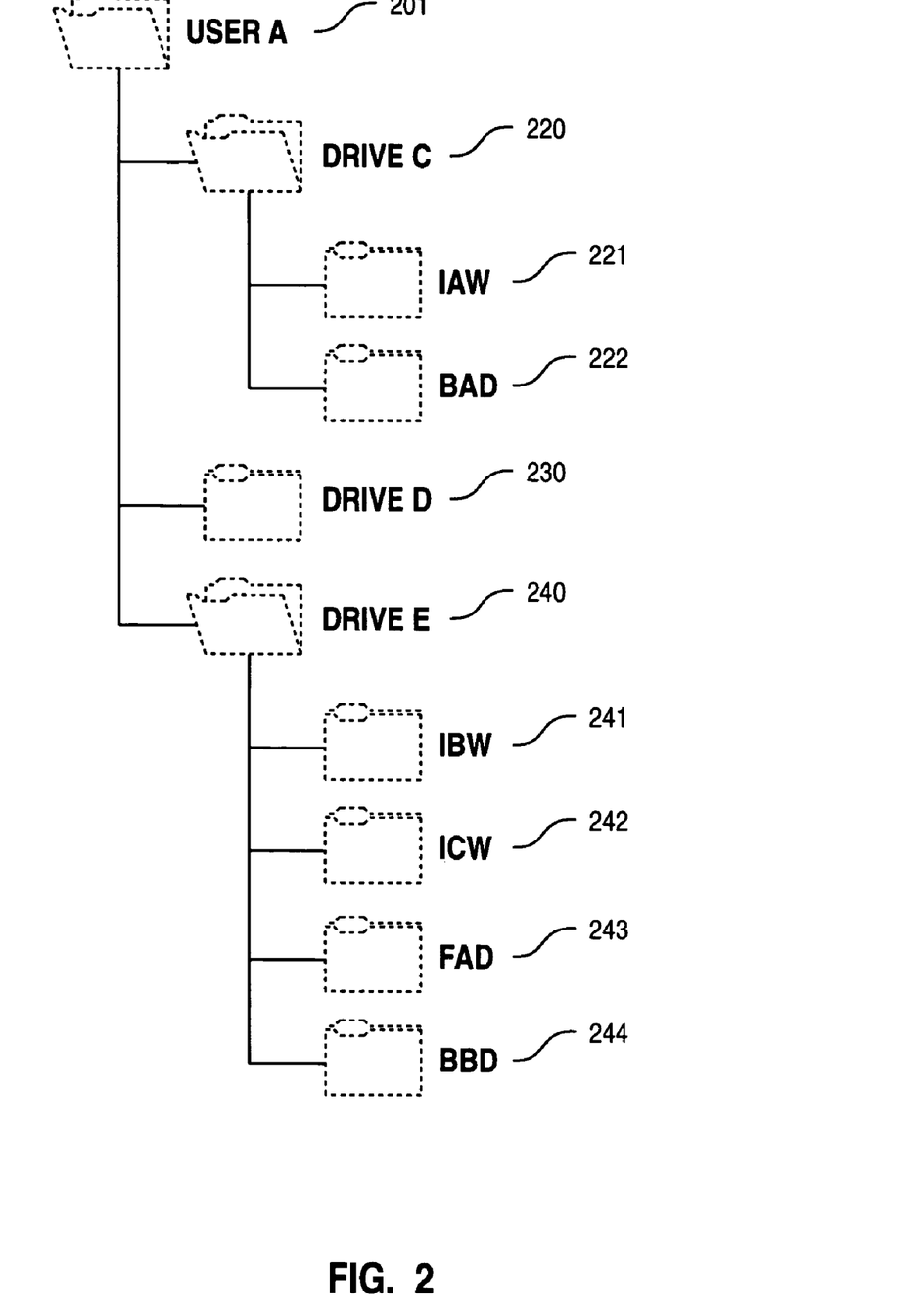
FIG. 2 illustrates a structure of a user's file system for which a preferred embodiment of the invention is advantageous.

The present invention is described with reference to a user's file system as illustrated in FIG. 2 User A 201 has image applications IA, IB, and IC. The working directories for these applications are IAW 221, IBW 241, and ICW 242. User A 201 also has two browsers BA and BB. The download directories for these browsers are BAD 222 and BBD 244, respectively. User A 201 also has a download directory for files retrieved via ftp call FAD 243. User A has generated jpg images in IAW 221, IBW 241, and ICW 242. User A has downloaded jpg images in BAD 222, BBD 244, and FAD 243. User A runs the tool of the present invention to place files and references to all jpg images in IAW 221. User A now runs the IA image application and has access, from the IAW directory 221, to all of the jpg images. The user runs the tool any time that the user wants the IAW directory 221 to be updated with new jpg images.

As further described below, the tool enables the following to be user selectable: specifying file/resource type, location list for finding the file/resource type including searching all current physical drives and/or network drives, and the destination location.

Profile:
  USER_TYPE_A.img, .jpg, .gif, IMAGE_TYPE
    C:\IAW;C:\BAD;E:\IBW;E:\ICW;E:\FAD;E:
    \BBD<or>C:;E:;
RunTime:

USER_TYPE_AC:\IAW

The tool will look for new, modified, and deleted files/resources and will update the image application working directory IAW accordingly.

Figure 3:
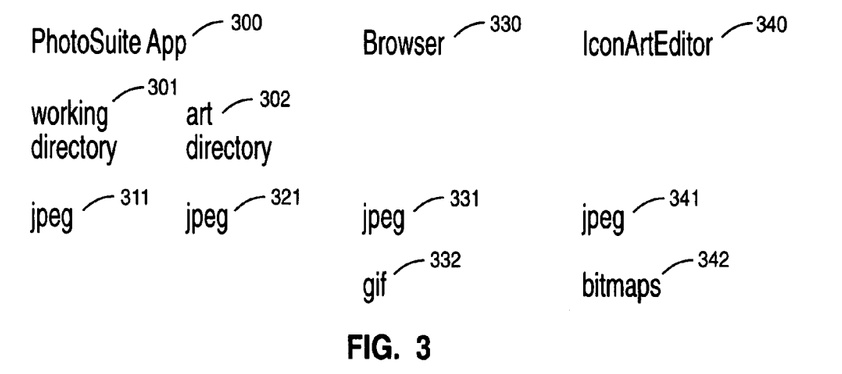
FIG. 3 is an illustration of similar types of files throughout a user's system.

More specifically, the present invention is also described in context of an application such as an Image Processing Application (IPA) 300 having a Browser 330 and an Icon Art Editor 340 as illustrated in FIG. 3. While utilizing the Image Processing Application 300, a user may desire to use jpeg files 311, 321 including spreadsheets, images, or any other resource. The jpeg files may be in a working directory 301 or in an art directory 302. Other jpeg files 331 and gif files 332 can be brought down from the Browser 330 by right mouse clicking on the Browser enabling the files to be stored in the Browser's default directory. The Icon Art Editor may store created bitmap files 342, jpeg files 341 and other files in the Icon Art Editor's own working directory.

When working in the Image Processing Application, a user may desire to see a list of all of the art that is available to the user which the user can put into the working directory of the Image Processing Application. As known in the art, the user may only see the files 321 that reside in the art directory 302 of the Image Processing Application; even though other desired files 331, 341 may be associated with other applications, or brought down over a network via a browser. A software tool of the present invention is utilized in conjunction with the Image Processing Application so that these other files 331, 341 may be readily accessible to the user from the Image Processing Application.

Figure 4:
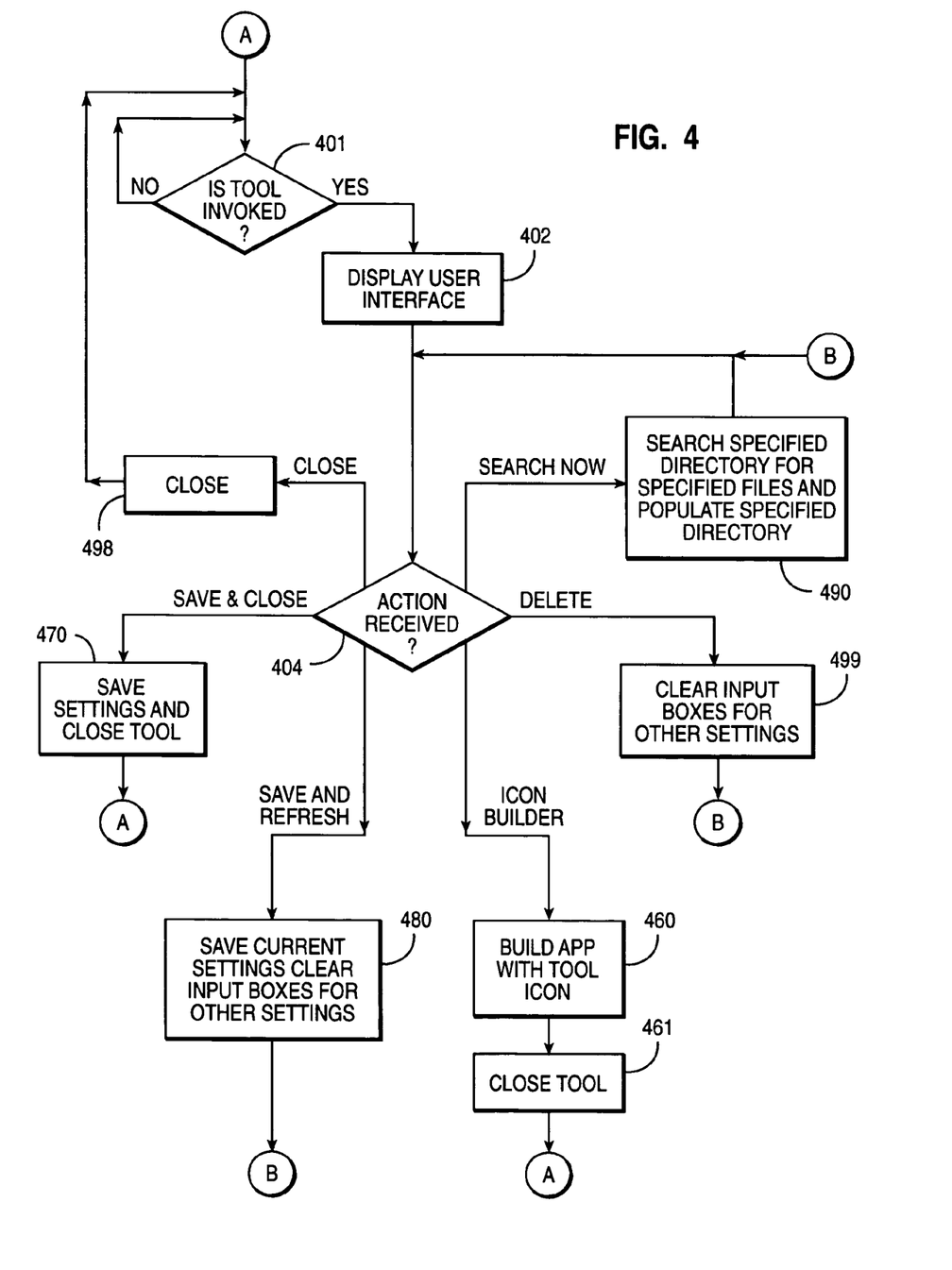
FIG. 4 is a process flow diagram of a preferred embodiment of the invention.
Figure 5:
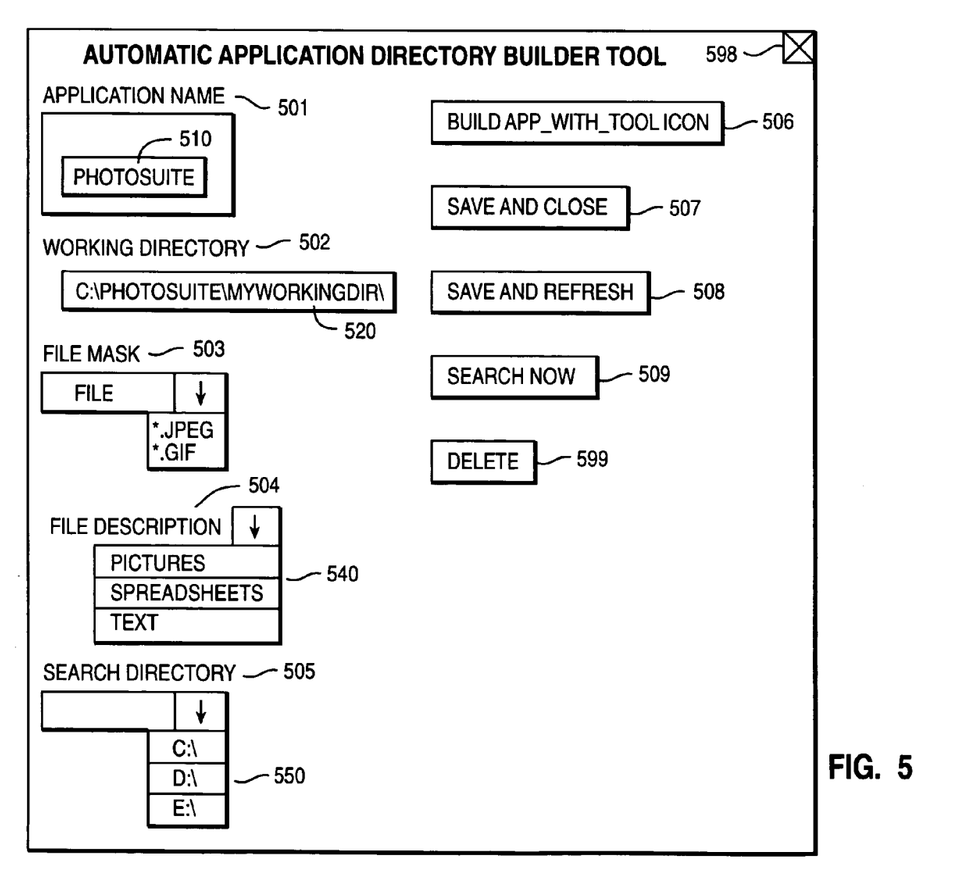
FIG. 5 illustrates a user interface of the automatic directory builder tool in accordance with a preferred embodiment of the invention.

The process flow of the tool of the present invention, shown in FIG. 4, begins when the tool is invoked by the user 401. If the tool is invoked, a user interface is displayed 402 to the user enabling the user to instantiate the tool for a specific application. A display screen showing an exemplary user interface 500 is shown in FIG. 5. Through the user interface, the user sets various parameters of the tool including application name 501, working directory 502, file mask 503, and at least one search directory 505. More specifically, as shown in the present example, the user has specified the application name to be the Image Processing application 510. The user then sets a generic working directory having any user specified label, e.g., c:\imageprocessing\myworkingdir\, 520. In addition, the user sets a file mask 503, e.g., *.jpeg; *.jif; 530, which would cause the tool to generate a list of files corresponding to the specified file mask type. Alternatively, the user could specify the file type by a general description 504 such as by selecting or inputting "pictures"; "spreadsheets"; "text", etc., 540. The tool would then associate certain file masks with the selected description. For example, if "pictures" were specified, the tool would search for and locate all *.jpeg and *.gif files, etc. The user also sets a search directory 505. The directories can be specified more generally such as "c:" and "d:" and "e:", 550; or they can be more specific, e.g., "c:/program files/internet_explorer 5.0/art/download".

Referring back to FIG. 4, after displaying the user interface 402, the tool waits to receive a user action, 404, such as the user actions enabled by buttons 506, 507, 508, 509, 599 as shown in FIG. 5. To save the settings as specified, and then close the tool, 470, FIG. 4, the "save and close" button 507 is selected. After the "save and close" action 470, the process returns to the beginning 401 until the tool is invoked again. To save the settings for the specified application, and continue with specifying settings for other applications, the "save and refresh" action is received by the tool when button 508 is selected. After saving the settings, the tool clears the input fields for other selections and adds the previous selections as selectable choices, 480. For example, once the settings are saved for a specified application, the application name becomes selectable in a menu for easy selection for later input. If the application name is selected, the settings previously saved for that application name are displayed to the user for further action including editing. After step 480, the tool returns to wait for other actions 404. Selection of button 599 deletes the currently displayed contents of the input fields, 499, and the process returns to wait for another user action 404. If the user selects the "search now" button 509, the tool searches the directories specified at input field 505 and moves or copies all files having the file type specified at input fields 503 or 504 to the specified directory 502, step 490. For example, the "search now" button 509 can be selected when the user has invoked the tool in one window and the specified application in another window. After the tool performs the searching, 490, the process returns to wait for another user action 404. The tool can be closed, 498, by selectable area 598, wherein the process returns to the beginning 401 until the tool is invoked again.

In another embodiment, the user interface 500 of the tool includes button 506 for generating a new desktop icon for the application in conjunction with the tool, 460. The tool then generates an icon for that application, e.g., image_app_plus, which includes the tool. As such, the desktop displays two icons for the application; one with the tool, and one without the tool. If the icon for the application without the tool is selected, then the application will be executed as is known in the art without the mapping, i.e., without automatically having other files readily accessible to the application.

When the user selects the newly created icon, e.g., image_app_plus, then the computer launches the application and the tool together. There is a link to the actual runtime executable, and to the set up information from the tool including the name of the working directory for the application and the file types identified for that working directory. The tool will automatically set up the working directory for the application with the user selected files. The launcher program is a command file or a batch file that up front takes all of the search paths that were specified, looks for the file specifications, and copies or moves them into the working directory of the specified application. As such, when the user now uses the application, all of the files needed or desired by the user are in a single directory.

The tool rebuilds the working directory each time the application is selected. This ensures that any new files that have been added to the resources of the system can be included this next time that the application is executed.

In a preferred embodiment the user interface of the tool is displayed only when the tool is invoked by itself apart from invoking a specific application. When an application is invoked that has been associated with the tool, the functions of the tool automatically uses the previously specified file types and previously specified target directory for that named application without further user interaction.

In another embodiment, even though the application and tool are launched together, the user interface 500 is immediately displayed to the user so that the user can input the settings for that application at that time or edit any settings that have been previously made and saved. In this way, the settings can be specified by the user each time the application is launched. When the application is closed, the tool is also closed, 461 FIG. 4, and the process returns to the beginning until the tool is invoked again 401, FIG. 4.

As discussed above, the tool searches the directories for the file types specified and places them into the specified directory in accordance with the settings saved for that application. The desired files are place in the specified location by creating a link to the desired files, or by shadowing the desired files, or by moving or copying the desired files. A shortcut method, using links or shadows, allows a representation of the file to be placed in the specified location while keeping the original file in its native directory. In other embodiments, a move or copy operation may be performed. If it is desirable to maintain original files, a move operation is performed. After the application is finished executing, the tool moves the files back to the directory where they were moved from. A move operation maintains the real original without having multiple copies of files coexisting in various directories and taking up hard disk space unnecessarily. A copy operation creates various instances of the file. There exists the potential that different instances, i.e., copies, of the file being used by different applications may cause the copies of the files to be in conflict with each other. Nevertheless, the copy operation remains a viable embodiment of the present invention. Any such potential conflict or sync problems among various copies of the files is minimized since typically the applications utilize the copy of the file in a read only mode, i.e., for viewing, thereby preserving the data integrity of that specific file or copy of the file. If the application does edit the file, the file name typically changes and the modified file becomes a new file specific to that application. As such, this new file would reside in the working directory for that application.

In one embodiment, the tool of the invention is run every time an application is started up. In a further embodiment, if files are being moved into the working directory of the tool for a first application, the tool does not move the files back when this first application is closed. Instead, the tool waits until a next application is started up. If the next application is the same as the first application that was just closed, the files are already there, and they do not have to be moved, again. As such, the tool is aware that this next application is the same application that was previously started up, and that all of the necessary files are still in the first application's working directory. If the next application is not the same application as the first application, then the files from the first application are then moved back out of the working directory of the first application; and any new files for this next application are identified and moved into the working directory for this next application.

In summary, the tool of the present invention is run to set up the mapping to the application, e.g., image_app. When the tool itself is invoked, the user interface displays a menu that allows a user to specify the application name and the file types to be located for the specified application name. The user can specify a directory, specific files, or any file/ resource type or masks, e.g., *.jpeg, *.gif, *.wks, etc. The user can also specify any type of files/resources more generically such as pictures, images, spreadsheets, text, documents, urls, etc. For example, if the user specified "pictures", then the tool would map all of the applicable extensions for the user, that is, the tool would go and find all of the *.gif, *.tif, and *.jpeg files. An advantage of generally specifying the type of files is that updates are avoided. That is, the set up of the tool does not need to be updated when new files within these generally defined types of files are created. Otherwise, the user would have to invoke the tool each time the user created a new file that the user wanted included in the working directory of a given application if it wasn't there already at the time of creation.

In further embodiments, the user interface for the tool is displayed to the user whenever a new application is installed.

Figure 6:
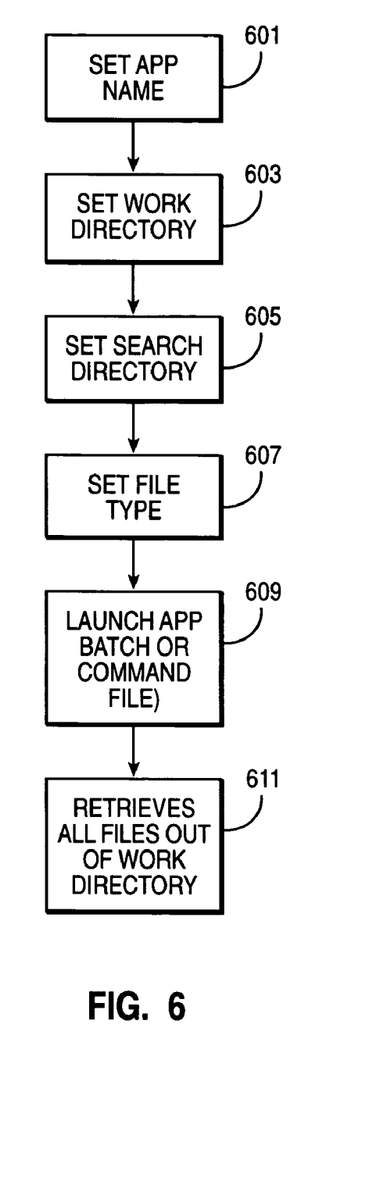
FIG. 6 illustrates user actions in accordance with a preferred embodiment of the invention.

FIG. 6 illustrates a process flow of user actions in accordance with a preferred embodiment of the invention. As described above, a user sets an application name 601, a working directory 603, the search directories 605, and file type 607. The user then launches the desired application trough a batch or command file 609. The user retrieves all desired files that were previously specified from the working directory of the application 611.

Figure 7:
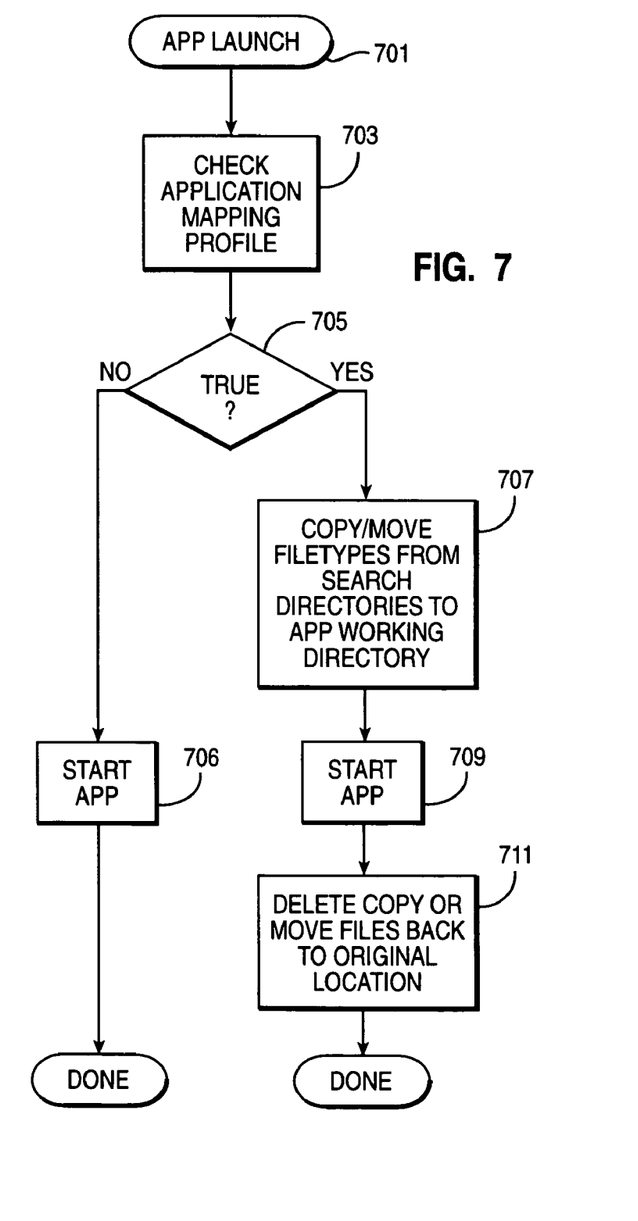
FIG. 7 illustrates the process flow of a preferred embodiment of the invention.

FIG. 7 illustrates the process flow of a tool of a preferred embodiment of the invention. When an application is launched 701, the tool checks the mapping profile for the application 703. If no mapping profile has been specified 705, then the application is started. If a mapping profile has been specified 705, then the tool copies or moves the specified file types from the specified search directory to the specified working directory of the application 707. The application is then started 709. When the application is ended, the tool moves the files back to the original location 711. Optionally, the tool can delete the files that were copied to the working directory, or let those files remain there for the next time the application is started.

It is intended that the scope of the invention be limited not by this detailed description, but rather by the claims appended hereto. The above specification, examples and data provide a complete description of the manufacture and use of the system, method, and article of manufacture, i.e., computer program product, of the invention. Since many embodiments of the invention can be made without departing from the spirit and scope of the invention, the invention resides in the claims hereinafter appended.

Having thus described the invention, what we claim as new and desire to secure by Letters Patent is set forth in the following claims.

The invention claimed is:

1. A computer program on a computer usable medium having computer readable program code means, comprising:
    program code means for generating a user interface having means for receiving a specified application name, at least one specified search directory, at least one specified target directory which is a working directory of the specified named application, and at least one specified file descriptor; and
    program code means for automatically populating the specified target directory with each file, from the at least one specified search directory, matching the specified file descriptor, when the specified named application is started.

2. The program of claim 1 wherein the means for automatically populating the specified target directory further comprises means for automatically moving each file, from the at least one specified search directory, matching the specified file descriptor, into the specified target directory when the specified named application is started.

3. The program of claim 1 wherein the means for automatically populating further comprises means for automatically copying each file, in the at least one specified search directory, matching the specified file descriptor, to the specified target directory when the specified named application is started.

4. The program of claim 2 further comprising program code means for moving back the automatically moved files to an originating directory of each moved file when the specified named application is ended.

5. The program of claim 1 wherein the file descriptor is at least one of a file mask and a general named description.

6. A method for enabling access, from one directory, a plurality of files originally residing in at least one other directory, the method comprising:
receiving a specification of the at least one other directory, at least one file descriptor, a specification of the one directory, and a specified application name;
automatically populating, when the specified named application is started, the specified one directory with each of the plurality of files, from one of the specified at least one other directory, matching the at least one file descriptor; and
enabling a user to have access to each of the plurality of files from the specified one directory when the specified named application is executing.

7. A method for enabling access, from one directory, to a plurality of files originally residing in at least one other directory, the method comprising:
generating a selectable icon for a named application in conjunction with a programming tool;
displaying, from the programming tool, a graphical user interface having means for receiving a specification of the at least one other directory, at least one file descriptor, a specification of the one directory, and a specified application name;
automatically populating the specified one directory with each of the plurality of files, from one of the specified at least one other directory, matching the at least one file descriptor, and launching the named application, when the selectable icon is selected; and
accessing each of the plurality of files from the specified one directory when the specified named application is executing.

8. A computer system having means for enabling access, from one directory, to a plurality of files originally residing in at least one other directory, the computer system comprising:
a graphical user interface having means for receiving a specification of the at least one other directory, at least one file descriptor, a specification of the one directory, and a specified application name;
means for automatically populating, when the specified named application is started, the specified one directory with each of the plurality of files, from one of the specified at least one other directory, matching the at least one file descriptor; and
means for enabling a user to have access to each of the plurality of files from the specified one directory when the specified named application is executing.

9. The computer system of claim 8 wherein the means for populating further comprises means for moving each of the plurality of files, from one of the specified at least one other directory, matching the at least one file descriptor, to the specified one directory.

10. The computer system of claim 9 further comprising means for moving back each of the moved files to each one of the specified at least one other directory.

11. The computer system of claim 10 wherein each of the moved files are moved back when a second application, different from the specified named application, is launched.

12. The computer system of claim 10 wherein the moved files are moved back when the specified named application is closed.

13. The computer system of claim 8 wherein the specified one directory is a working directory of the specified named application.

14. The computer system of claim 8 wherein the means for populating further comprises means for copying each of the plurality of files, at one of the specified at least one other directory, matching the at least one file descriptor, to the specified one directory.

15. A computer system having means for enabling access, from one directory, to a plurality of files originally residing in at least one other directory, the computer system comprising:
means for generating a selectable icon for a named application in conjunction with a programming tool;
means for displaying, from the programming tool, a graphical user interface having means for receiving a specification of the at least one other directory, at least one file descriptor, a specification of the one directory, and a specified application name;
means for automatically populating the specified one directory with each of the plurality of files, from one of the specified at least one other directory, matching the at least one file descriptor, and launching the named application, when the selectable icon is selected; and
means for accessing each of the plurality of files from the specified one directory when the specified named application is executing.

16. A computer system having means for enabling access, from one directory, to a plurality of files originally residing in at least one other directory accessible to the computer system, the computer system comprising:
a software program tool having means for displaying a graphical user interface having means for receiving a specification of the at least one other directory, at least one file descriptor, a specification of the one directory, and a specified application name;
an application having the specified application name;
means for invoking the software program tool to automatically populate the specified one directory with each of the plurality of files, from one of the specified at least one other directory, matching the at least one file descriptor, each time the named application is launched; and
means for accessing each of the plurality of files from the specified one directory when the specified named application is executing.

* * * * *